Nov. 10, 1931. C. R. BLUM 1,831,735
SYNCHRONISM SYSTEM
Filed Sept. 11, 1929 3 Sheets-Sheet 1

Inventor:
Carl Robert Blum
by [signature]
Attorney

Nov. 10, 1931.   C. R. BLUM   1,831,735
SYNCHRONISM SYSTEM
Filed Sept. 11, 1929   3 Sheets-Sheet 2

Inventor:
Carl Robert Blum
by
Attorney

Nov. 10, 1931. C. R. BLUM 1,831,735
SYNCHRONISM SYSTEM
Filed Sept. 11, 1929  3 Sheets-Sheet 3

Inventor:
Carl Robert Blum
by
Attorney

Patented Nov. 10, 1931

1,831,735

UNITED STATES PATENT OFFICE

CARL ROBERT BLUM, OF BERLIN-SCHONEBERG, OF GERMANY

SYNCHRONISM SYSTEM

Application filed September 11, 1929, Serial No. 391,730, and in Germany September 27, 1926.

It is a well-known problem to operate several engines locally separated, which cannot or must not be coupled to each other mechanically, in such a manner, that their number of rotations is absolutely equal or in definite relation, which will remain constant at all speeds. Endeavors were made to solve this task by means of synchronous motors connected to an alternate current net work, since the number of revolutions of this type of motors as is well known possesses a fixed ratio in view of the number of cycles of the network. Plants of that type operating with synchronous motors however show various drawbacks. Firstly a control of the number of cycles is practically not possible, since it is hardly feasible to carry through a change of the periodicity in the network, and secondly such motors must be brought in the first line to the periodicity of the network and corresponding to the synchronous number of revolutions, before they are capable of continuing their run independently. Finally the synchronism thus obtained is not absolute, since with these motors, as is well known, a certain slipping cannot be avoided under changing loads.

For that reason for the driving of devices to be synchronous in respect of another one, magneto-electric engines having a stator pole ring have been suggested, whose continuous current excitation is controlled by a contacting device coupled with the shaft of the other power engine in such a manner, that a rotating field of force is formed, which the armature can follow. Though this way has shown better results than the employment of synchronous motors, it was found, that such magneto-electric engines are not capable of maintaining synchronism absolutely and reliably. In particular it was found that the armature failed to follow the stator rotating field in an absolutely reliable manner, inasmuch as it sometimes will stick or slip to a small extent with respect to the stator rotating field.

According to the present invention this drawback is obviated with the known magneto-electric engines, so that the engine according to the invention is capable of being used to advantage in many lines of work, for instance in rapid or multiplex telegraphy.

According to the invention the exciting member of the electro-magnetic engine consists of two co-axial pole rings, either of which will show positive and negative poles and which are staggered with respect to each other in such a manner, that in the direction of the axis of the machine unlike poles will face one another. Here the poles adjacent to each other in the direction of the axis of the machine are always excited simultaneously, by which the pole shoes of the armature are influenced in a different magnetic sense.

The contacting device controlling the excitation of the magneto-electric engine need not be driven by a motor having a regular number of revolutions, but it can be connected, for instance, with a hand-driven crankshaft, whose number of revolutions can be changed within any desired limits.

In this instance the magneto-electric engine will accurately follow the variations in the number of revolutions. The secondary magneto-electric engine controlled by the primary engine in its turn may be likewise connected with a contacting device, serving for the control of one or a plurality of additional engines.

A mode of execution of the invention is illustrated by way of example on the drawings.

Figure 1 schematically shows the connection of the primary and secondary (magneto-electric) engines, Figure 2 is a section through the magneto-electric engine.

Figure 1:
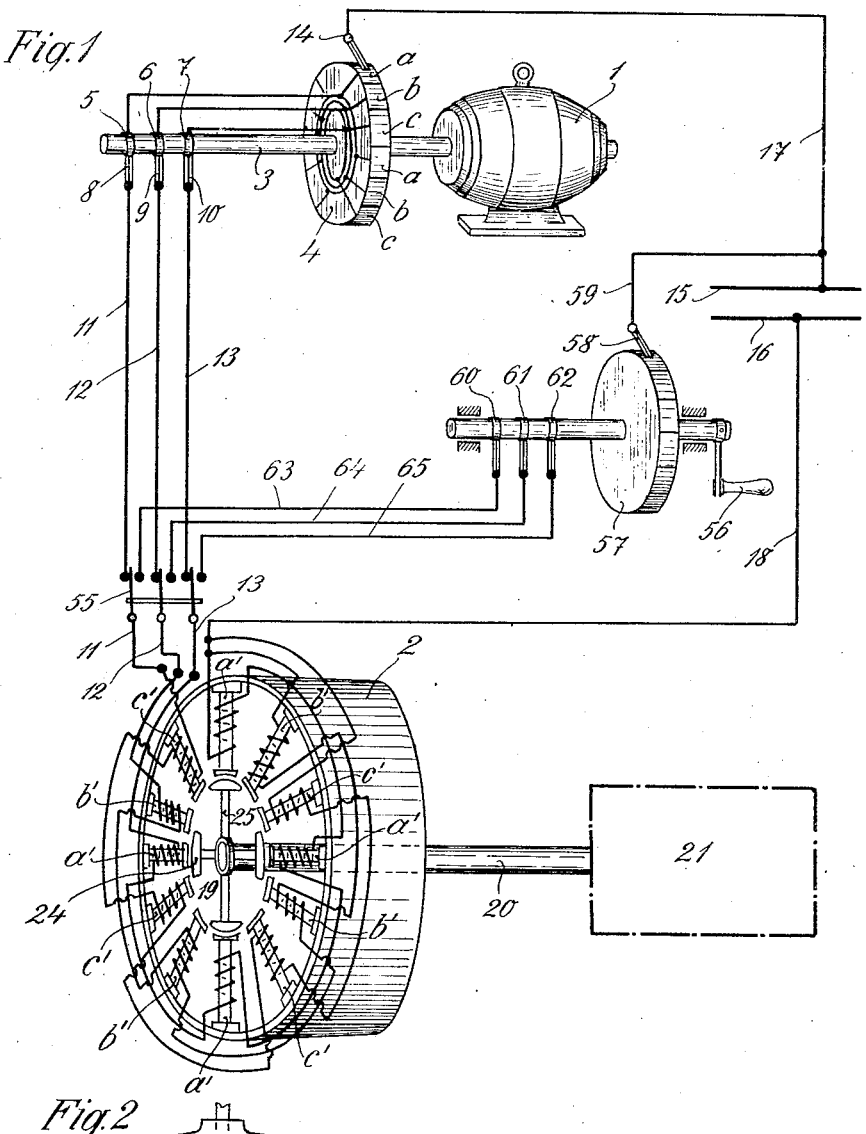

In the schematic arrangement as represented in Figure 1 the primary motor 1, whose number of revolutions is to coincide with that of the secondary motor 2, is connected by means of the connecting arrangement described hereinafter. In this exemplification the ratio of the number of revolutions between the motors 1 and 2 is equal, that is to say, both motors have the same number of revolutions.

Upon the shaft 3 of the primary motor 1, which in a given case may be replaced, as already mentioned, by a machine having an irregular number of revolutions, is mounted a controlling device 4 regulating the run of the secondary magneto-electric motor 2.

The contacting device mounted on the shaft 3 consists of the following members: a disc 4 possesses a plurality of conducting elements, which are insulated from each other and electrically connected in three groups with the collector-rings 5, 6, 7. The third collector-ring each time is connected in parallel, so that groups a, b, c are formed. Suppose the group a is connected with the collector-ring 5, b with the ring 6 and c with the ring 7.

By brushes 8, 9 and 10 resting upon said collector-rings connection is obtained with the magneto-electric engine 2 by way of the leads 11, 12, 13. The necessary voltage is supplied to this arrangement through the brush 14 sliding upon said conducting segments and is tapped from the network 15, 16, which obviously could be replaced by a battery. The connection with the network is designated by 17. The network line 16 is connected with the magneto-electric engine 2 by means of the lead 18. Naturally the leads 11, 12, 13 and 18 may be of any desired type and length, so that any desired local separation between the primary and secondary engines is rendered possible.

Over these four mentioned leads 11, 12, 13 and 18 different groups of electro-magnets of the magneto-electric engine 2 are controlled. In order to better illustrate the cooperation between the contacting device and the engine 2, the magnets are designated by the same letter however, with an index. By the collector-segment $a$ the group $a'$ of magnets is controlled, by the collector-segment $b$ the group $b'$ of magnets and by segment $c$ the group $c'$. Thus the number of conducting groups of the device 4 is identical with the number of groups of magnets connected in parallel.

An armature not wound and designated by 19, is rotatably mounted within the magnets, said armature being secured to a shaft 20, driving the device 21 which is to be maintained in synchronism with the device 1.

As can be seen from the illustration, the magnets of one group are connected in succession or series and said magnets are excited simultaneously through one of the segments $a$, $b$ or $c$ of the contact disc 4. The return lead 18 is common to all groups.

During the rotation of the motor 1 a segment $a$ will first pass beneath the brush 14, by which the group $a'$ of magnets is excited, then follows $b$ supplying the group $b'$ with current and then the segment $c$. Thus the direction of rotation of the magneto-electric engine 2 is dependent on the succession of the conducting segments of the contact disc 4.

Figure 2:
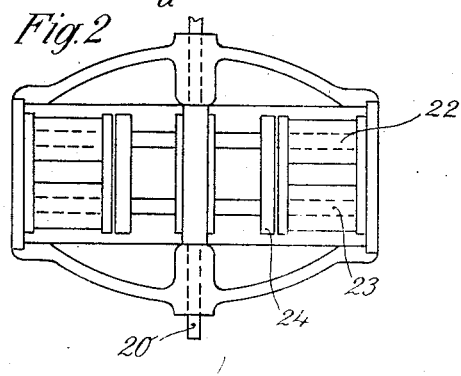
Figure 3:
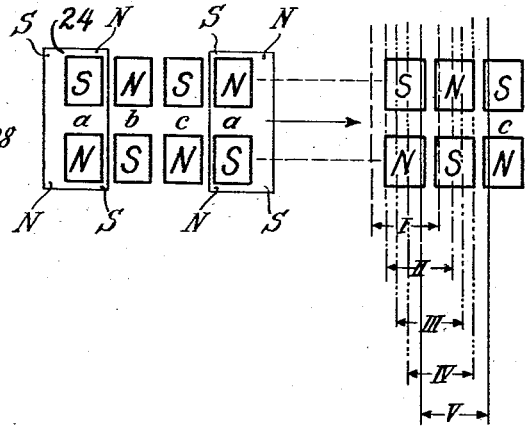
Figure 3 shows the arrangement of the poles of the magneto-electric engine.

For sake of clearness in the schematic illustration in Figure 1 only one magnet is arranged at a time in the direction of the machine axis, but in practice and as shown in Figures 2 and 3, always two magnets 22 and 23 are positioned beside one another in axial direction and belong to the same group. This follows particularly from Figure 3. These magnets are connected in series so that the polarity of the magnets changes, whereby adjacent to a magnet 23 of the group $a$, possessing for instance north-magnetic polarity, a magnet 23 belonging to the group $b$ is placed, having south-magnetic polarity.

The operation of the magneto-electric engine is more fully explained with reference to Figure 3 in which the arrangement of the poles is represented in plane development. The pole-shoes 24 of the armature 19 are somewhat larger than half of the pole division. By pole division the distance between centers of even poles is to be understood. The pole-shoes 24 of the armature thus are constantly subjected to the magnetic flux of four poles (two magnets 22 and 23 each of two different groups of magnets), by which the diagonally opposite corners thereof are always excited by electricity of the same sign. The polarity can be made out from Figure 3, left portion, in that there the letters N and S will indicate, which polarity the magnets 22, 23 and the pole-shoe 24 of the armature respectively possess. According to generally accepted physical principles always opposite polarities must be formed, so that a north-magnetic polarity will be opposed by a south-magnetic polarity.

From the right-hand half of Figure 3 various phases of movement of the pole-shoe 24 of the armature relatively to the stationary magnet can be seen. If the magnets belonging to the group $a'$ were to be excited only, the pole-shoe 24 would place itself symmetrically below the poles 23, 22 belonging to the group $a'$ (the position I in Figure 3 right-hand side indicated in broken lines). Owing to the latent force of rotation of the pole wheel it will however move into the symmetrical position marked II.

By the rotation of the contact disc 4, after the group $a'$ of magnets has been excited, the group $b'$ also is excited. Owing to the width of the brush 14 one is at liberty to select in special cases the period, during which groups $a'$ and $b'$ are excited simultaneously, in any desired manner, for through a wide brush 14 the insulation situated between the segments

*a* and *b* of the contact disc 4 is bridged for a longer or shorter period.

By the simultaneous excitation of the magnets 22 and 23 of the groups *a'* and *b'* the pole-shoe 24 of the armature is forced into the magnetic central position between the two poles. This position is indicated by III. However, owing to the momentum of inertia it will be pushed, as stated above, beyond said position, to wit in that position marked IV.

After the simultaneous excitation of two groups of magnets is finished, the magnets *a'* are deenergized and only the magnets belonging to the group *b'* are actuated by the current. Owing to this the pole-shoe of the armature will be further displaced in the direction of the arrow to the position V, in which all four corners of the pole-shoe of the armature are changed in their polarization through the different polarity of the magnets belonging to the group *b'*.

During the passage from the group *b'* of magnets to group *c'* the same performance will be repeated, so that a description thereof may be dispensed with. It is easy to understand that the run of the magneto-electric engine is the more uniform the higher the number of the groups or exciting poles respectively is chosen. Besides, it will be of advantage to interpose between the secondary magneto-electric engine and the device to be driven, an elastic coupling or connection, in order to render the run more uniform.

In order to render possible the constant change of polarity it is preferable to produce the pole-shoes 24 of the armature of very soft iron. The shanks 25 of said pole-shoes are made of non-magnetic material. The cores of the exciting magnets 22, 23 are likewise made of soft iron, in order to have them lose their magnetism as quickly as possible after cessation of their excitation. This is done in order to maintain in the pole wheel the life force, which will be required, as stated above, in order to shift it each time beyond the magnetic central position.

It is of advantage for the most purposes of use, that the engine 1 and the engine 2 run synchronously, but that they possess different numbers of revolution. According to a further feature of the invention it is possible by the arrangement described hereinafter to operate two devices on different numbers of revolution but ensure in spite of this the synchronism of their movement.

Figure 4:
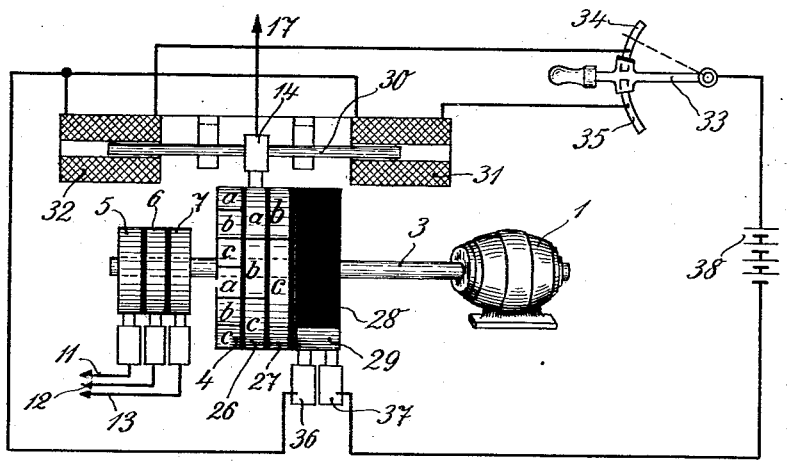
Figure 4 illustrates the device for obtaining various ratios between the primary and secondary engines.
Figure 5:
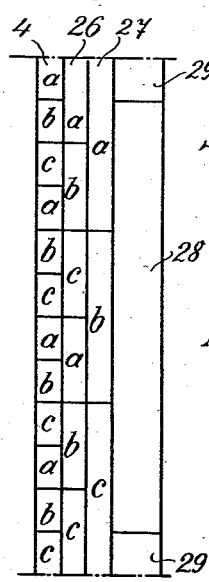
Figure 5 is a development of the contact disc shown in Figure 4.
Figure 6:
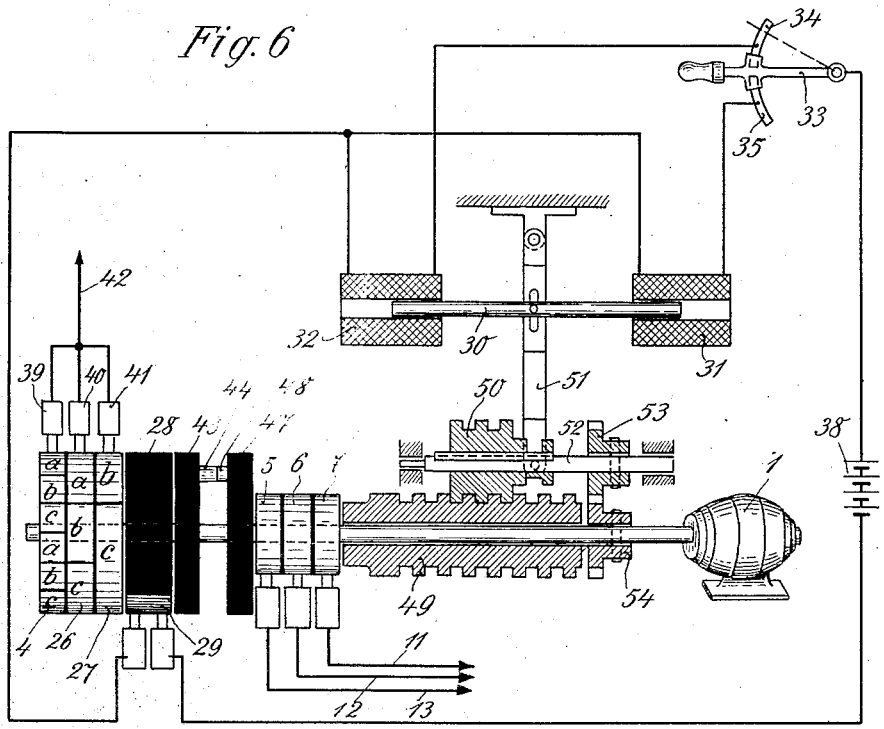
Figures 6, 7 and 8 represent modifications of the arrangement according to Figure 5.

The arrangements illustrated in Figures 4 and 6 are particularly adapted for purposes of that kind.

In these arrangements too the principle represented in Figure 1 is applied and a plurality of discs corresponding to the contact disc 4 in Figure 1 are arranged side by side and insulated from each other and which will effect according to requirements the control of the secondary magneto-electric engine 2. In the example illustrated in Figure 4 there are mounted on the axle 2 besides the contact disc 4 two additional controlling discs 26 and 27.

In addition to the three contact discs (4, 26, 27) referred to there is secured to the same shaft another contact disc 28 having a small conducting element 29. The action of this disc is explained hereinafter.

In order to render more easy the understanding, the contact discs 4, 26, and 27, 28 are represented by evolvent. The contact disc 4 possesses four conducting elements each belonging to the groups *a*, *b* and *c*, that is to say 12 elements altogether. In contradistinction the contact disc 26 is provided with two of each of the conducting elements belonging to the said groups, that is six conducting elements; and the contact disc 27 has only three conducting elements. By means of this arrangement during a rotation of the shaft 2 of the motor 1 and provided that the connections are cut in the contact disc 4 will excite the individual groups of magnets four times during such rotation of the shaft, while the contact disc 26 will cause such excitations twice, and when the contact disc 27 is used only once. The selection of the contact disc each time is effected by means of the brush 14, which is capable of being displaced in axial direction.

In order to carry out a long-distance control of the whole arrangement the displacement of the brush 14 can be effected by means of an electro-magnetic device. The axle 30 to which is secured the brush 14, can be displaced towards the right or left hand side just according to the position of the said brush by means of the electro-magnets 31 and 32. The brush 14 is connected with the lead 17 and by this means either the contact discs 4, 26 or 27 are inserted into the circuit.

The excitation of the electro-magnets 31 and 32 is effected by means of the selector switch 33. If the switch 33 rests upon the segment 34 (drawn in dash and dotted lines) the left magnet coil 32 will be energized and the brush 14 is displaced and pulled to the left, cutting in the contact disc 4. When the switch 33 passes into the central position drawn in dash and dotted lines between the segments, both electro-magnets are energized to the same extent and the brush 14 can only assume the central position, which is represented in Figure 4. If the switch is shifted to the segment 35 the brush 14 is pulled by the electro-magnet 31 towards the right hand side on the contact disc 27.

In order to ensure synchronism of the primary engine 1 and the secondary engine 2 when changing from one ratio to the other, a contact disc 28 having a conducting element 29, is provided. On this disc slide two brushes 36 and 37 which are situated in the energizing circuit of both the electromagnets 31 and 32. A passage of current by way over the exciting coils and the source of current 38, supplying the long-distance control, can take place only if the segment 29 lies beneath the brushes 36 and 37. The position of the segment 29 relatively to the contact discs 4, 26 and 27 is so chosen, that the change from one contact disc to the other is effected in that instant, at which the conducting segments of the same group rest below the brush 14, for it is obvious that during the change there will be a position in which the conducting segments of two contact discs are bridged by the brush 14.

By selection of one of the three contact discs 4, 26 or 27 the ratio of the number of revolutions of the primary engine 1 and the magneto-electric engine 2 in the example shown can be determined 1:1, 1:2 or 1:3.

In lieu of displacing the brush 14 the collector device 4, 26 and 27 could be displaced and the brush remain stationary.

Figure 7:
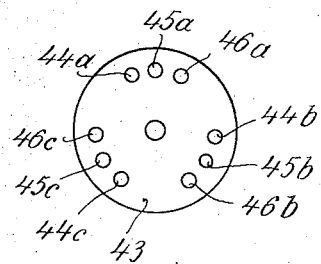
Figure 8:
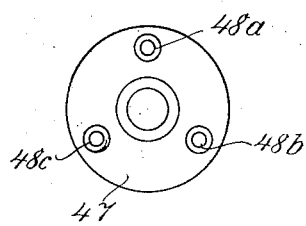

The variable ratio between the primary motor 1 and the secondary magneto-electric engine 2 can also be effected by the arrangement shown in Figure 6, which is similar to the arrangement illustrated in Figure 4. Upon the shaft 2 driven by the motor 1 are mounted the three contact discs 4, 26 and 27. In this instance, however, there slide three brushes 39, 40 and 41 upon the contact discs. The said three brushes are interconnected and the current is supplied through the lead 42. On an additional disc 43, also shown in Figure 7, there are provided contact pins 44, 45 and 46, which are in connection each time with one of the conducting groups $a$, $b$ and $c$ and the contact discs 4, 26 and 27. This is indicated in the drawings in that besides the number of the contact pin also the letters $a$, $b$ and $c$ are shown.

By means of a disc 47 rotatable on the shaft 2, which disc also rotates with the contact disc, adjustable relatively to the disc 43, the contacts 44$a$, 44$b$ and 44$c$ will on the one hand effect connection with the contacts 48$a$, 48$b$, 48$c$, and on the other hand with 45$a$, 45$b$, 45$c$ or 46$a$, 46$b$, 46$c$. The three pins 44 that is 44$a$, 44$b$, 44$c$ are in connection with the conducting segments of the contact disc 4. The pins 45 are connected with 26 and 46 with 27. The contacts 48 proper are conductively connected with the sliding rings 5, 6, 7, upon which slide the brushes 8, 9, 10.

The turning of the discs 43 and 47 relatively to one another is effected by means of the screw wheels 49 and 50. The worm-wheel 49 rotatably mounted on the shaft 2 meshes with the worm-wheel 50 which can be displaced by means of the lever 51. The said lever 51 is again actuated by the electromagnetic coils 31 and 32. To the shaft 52 carrying the worm-wheel 50 is keyed a gear-wheel 53 meshing with a gear-wheel 54 on the shaft 2. During the rotation of the shaft 2 the rotary motion is transmitted from the gear-wheel 54 to 53 and consequently to the worm-wheel 50. This latter meshes with the worm-wheel 49, causing the disc 47 rigidly connected with the said worm-wheel to rotate at the same speed as the shaft 2. If however, by the energizing of the magnet coils 31 and 32 the lever 51 is displaced, the worm-wheel will simultaneously be shifted to the right or left side. However, as wheel 50 meshes with wheel 49 the worm-wheel 49 will be turned and the contacts provided on the disc 47 shifted to one of the other groups 44, 45 or 46 and consequently one or the other of the contact discs 4, 26 or 27 is cut in. Thus one is at liberty through this arrangement to change the ratio of the number of revolutions between the primary engine and the secondary magneto-electric engine.

The change of the ratio of the number of revolutions need in no case be effected by hand as represented so far, but for the sake of secrecy in telegraphic plants or the like it will be advantageous to change, through any electrical or mechanical device, the ratio in irregular rythm. This can be done either through corresponding combinations of the relays, connected to a clock, or also entirely mechanically through a rotating curved disc.

In special cases it may be of advantage to arrange near the secondary magneto-electric engine a device, which will render it possible to continue to turn the secondary engine 2 and consequently the device 21 connected with it, without operating the motor 1. For carrying this through it is necessary to interrupt the circuit between the contact device coupled with the primary engine and to form instead a fresh subsidiary circuit. For that purpose in the arrangement according to Figure 1 a switch 55 is provided, through which on displacing it towards the right hand side, the lines 11, 12, 13 are interrupted and a fresh circuit is formed, into which is inserted a device similar to or identical with the contact disc 4. By means of a hand-actuated crank 56 a contact disc 57 can be operated which corresponds to the contact disc 4. Upon the disc 57 slides the brush 58, which is connected with the lead 59. The conducting segments $a$, $b$, $c$ are connected with the sliding rings 60, 61, 62, which effect the conducting connections with the leads 63, 64, 65. By operating the crank the magneto-electric engine 2 is controlled in the same manner as through the rotation of the disc 4.

I claim:

1. In means for synchronizing two driven mechanisms, a primary motor, a secondary magneto-electric motor comprising an armature having a plurality of pole pieces and a plurality of groups of exciting magnets, means operated by the primary motor for controlling the supply of current to the magnets, means for varying the periodicity of the supply of current to the magnets for varying the ratio of revolution of the motors, and means operative to maintain a supply of current and the synchronism of the motors during a ratio change action of the aforesaid means.

2. In means for synchronizing two driven mechanisms, a primary motor, a secondary magneto-electric motor comprising an armature having a plurality of pole pieces and a plurality of groups of exciting magnets, a contact device embodying a plurality of sets of contacts for supplying current serially to the groups of magnets at different predetermined periods to regulate the ratio of revolution of the motors, and means for maintaining a supply of current to the magnets and the synchronism of the motors in shifting from one ratio to another.

3. In a machine of the kind described, a plurality of commutator rings arranged side by side and having the segments of each ring of an arcuate length different from the segments of the remaining rings, means to rotate the rings in unison, a magneto-electric motor comprising a plurality of groups of exciting magnets, a brush for supplying current to said commutator rings, means to mount the brush for shifting from one ring to another, and connections between the segments and groups of magnets arranged to supply current serially to the groups of magnets.

4. In a machine of the kind described, a plurality of commutator rings arranged side by side and having the segments of each ring of an arcuate length different from the segments of the remaining rings, means to rotate the rings in unison, a magneto-electric motor comprising a plurality of groups of exciting magnets, the magnets of each group being connected in series and each group being in overlapping relation to the adjacent group, a brush for supplying current to said commutator rings, means to mount the brush for shifting from one ring to another, and connections between the segments and groups of magnets arranged to supply current serially to the groups of magnets.

5. In a machine of the kind described, a plurality of commutator rings arranged side by side and having the segments of each ring of an arcuate length different from the segments of the remaining rings, means to rotate the rings in unison, a magneto-electric motor comprising a plurality of groups of exciting magnets, a brush for supplying current to said commutator rings, means to mount the brush for shifting from one ring to another, a series of collector rings revolving in unison with said commutator rings, electrical connections connecting the successive segments of each commutator ring to the successive collector rings in regular order, collector brushes each engaging a respective collector ring, and conductive connections between the respective collector brushes and the respective groups of magnets.

6. In a machine of the kind described, a plurality of commutator rings arranged side by side and having the segments of each ring of an arcuate length different from the segments of the remaining rings, means to rotate the rings in unison, a magneto-electric motor comprising a plurality of groups of exciting magnets, the magnets of each group being connected in series and each group being in overlapping relation to the adjacent group, a brush for supplying current to said commutator rings, means to mount the brush for shifting from one ring to another, a series of collector rings revolving in unison with said commutator rings, electrical connections connecting the successive segments of each commutator ring to the successive collector rings in regular order, collector brushes each engaging a respective collector ring, and conductive connections between the respective collector brushes and the respective groups of magnets.

In testimony whereof I have affixed my signature.

CARL ROBERT BLUM.